(12) United States Patent
Park

(10) Patent No.: US 11,633,779 B2
(45) Date of Patent: Apr. 25, 2023

(54) METHOD AND APPARATUS FOR MANUFACTURING A FORGED COMPONENT

(71) Applicants: HYUNDAI MOTOR COMPANY, Seoul (KR); KIA MOTORS CORPORATION, Seoul (KR)

(72) Inventor: Jae Bong Park, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 47 days.

(21) Appl. No.: 16/909,415

(22) Filed: Jun. 23, 2020

(65) Prior Publication Data

US 2021/0094088 A1 Apr. 1, 2021

(30) Foreign Application Priority Data

Sep. 30, 2019 (KR) .......................... 10-2019-0121020

(51) Int. Cl.
*B21J 5/02* (2006.01)

(52) U.S. Cl.
CPC ..................... *B21J 5/025* (2013.01)

(58) Field of Classification Search
CPC ......... B21J 1/06; B21J 5/00; B21J 5/02; B21J 5/022; B21J 5/025; B21J 5/027; B21J 5/06; B21J 9/02; B21J 9/022; B21K 1/766; B21D 53/84

USPC ......................................................... 29/90.7
See application file for complete search history.

(56) References Cited

U.S. PATENT DOCUMENTS

2012/0305147 A1* 12/2012 Lee ..................... C21D 9/0068
148/649
2014/0360018 A1* 12/2014 Chavdar ................. B23P 15/14
29/893.34

FOREIGN PATENT DOCUMENTS

| CN | 109351909 A | * | 2/2019 | ............. B21J 13/02 |
| KR | 20090120996 A | * | 11/2009 | |
| KR | 101882495 B1 | * | 7/2018 | |
| KR | 101882495 B1 | | 7/2018 | |
| WO | WO-2018155604 A1 | * | 8/2018 | ............... C21C 7/04 |

* cited by examiner

*Primary Examiner* — Teresa M Ekiert
(74) *Attorney, Agent, or Firm* — Lempia Summerfield Katz LLC

(57) ABSTRACT

A method for manufacturing a forged component includes: performing hot forging on a material; heating the hot forged material to a first set temperature; and performing warm coining to correctly shape the heated material. The material may be heated to a second set temperature before hot forging. The material heated to the second set temperature may be hot forged. The second set temperature may be higher than the first set temperature. The hot forged material may be subjected to controlled cooling to a third set temperature at a predetermined cooling rate. The controlled cooled material may be heated to the first set temperature. The third set temperature may be lower than or equal to the first set temperature.

7 Claims, 2 Drawing Sheets

METHOD AND APPARATUS FOR MANUFACTURING A FORGED COMPONENT

CROSS-REFERENCE TO RELATED APPLICATION

This application is based on and claims the benefit of priority to Korean Patent Application No. 10-2019-0121020, filed on Sep. 30, 2019, in the Korean Intellectual Property Office, the disclosure of which is incorporated herein in its entirety by reference.

TECHNICAL FIELD

The present disclosure relates to a method and an apparatus for manufacturing a forged component, and more particularly, to a method and an apparatus for manufacturing a forged component capable of improving mechanical properties, coining quality, and process quality.

BACKGROUND

As is well known, moving parts of engines, such as connecting rods and crankshafts, are forged components manufactured by forging processes.

Forged components for vehicles having a symmetrical shape, such as connecting rods, may be manufactured by performing hot forging, followed by cold coining in cold conditions (room temperature). In order to remove residual stress formed in the forged components during cold coining, heat treatment such as stress relief annealing (SRA) may be performed.

In order to respond to recent trends in vehicle engine development, such as high performance and light weight characteristics, high strength materials are applied to the connecting rods and forged components for vehicles.

As the high strength materials are used for the connecting rods and the like, the bending amount of the connecting rods may increase due to spring back after cold coining. Also, bursts may occur at the big ends of the connecting rods during cold coining.

The above information described in this background section is provided to assist in understanding the background of the inventive concept, and may include any technical concept, some of which are not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a method and an apparatus for manufacturing a forged component capable of improving mechanical properties, coining quality, and process quality by reducing a bending amount associated with spring back and preventing the occurrence of bursts during coining.

According to an aspect of the present disclosure, a method for manufacturing a forged component may include: performing hot forging on a material; heating the hot forged material to a first set temperature; and performing warm coining to correctly shape the heated material.

The material may be heated to a second set temperature before hot forging. The material heated to the second set temperature may be hot forged. The second set temperature may be higher than the first set temperature.

The hot forged material may be subjected to controlled cooling to a third set temperature at a predetermined cooling rate. The controlled cooled material may be heated to the first set temperature. The third set temperature may be lower than or equal to the first set temperature.

The predetermined cooling rate may be 1-4° C./second.

The controlled cooled material may be heated to the first set temperature by performing high-frequency induction heating for 5 to 10 minutes.

The warm coining may be performed immediately after the material is heated to the first set temperature.

The hot forged material may be trimmed and pierced. The trimmed and pierced material may be controlled cooled to the third set temperature at the predetermined cooling rate.

The second set temperature may range from 1100° C. to 1200° C.

Shot blasting may be performed on a surface of the warm coined material.

The forged component may be a connecting rod used in an engine of a vehicle.

According to another aspect of the present disclosure, an apparatus for manufacturing a forged component may include: a hot forging machine, which performs hot forging on a material for manufacturing a forged component; a high-frequency induction heater, which heats the hot forged material to a first set temperature; and a warm coining machine, which performs warm coining to correctly shape the heated material.

The warm coining machine may be located close to the high-frequency induction heater so that the material may be subjected to warm coining immediately after being heated to the first set temperature.

The warm coining machine may include an upper coining die and a lower coining die located below the upper coining die. The upper coining die and/or the lower coining die may have a cavity conforming to a shape of the forged component.

The high-frequency induction heater may allow the material to be heated to the first set temperature by a heating coil to which a high-frequency alternating current is applied.

The hot forging machine may include a buster die, a blocker die, and a finisher die.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
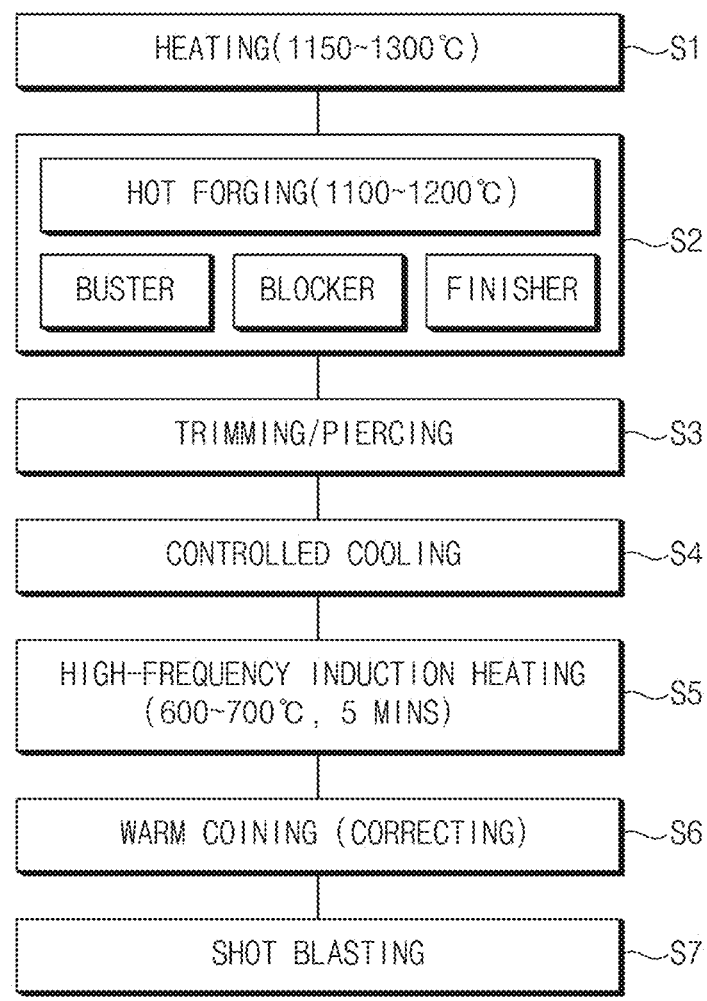
FIG. 1 illustrates a flowchart of a method for manufacturing a forged component according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure have been omitted in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 2:
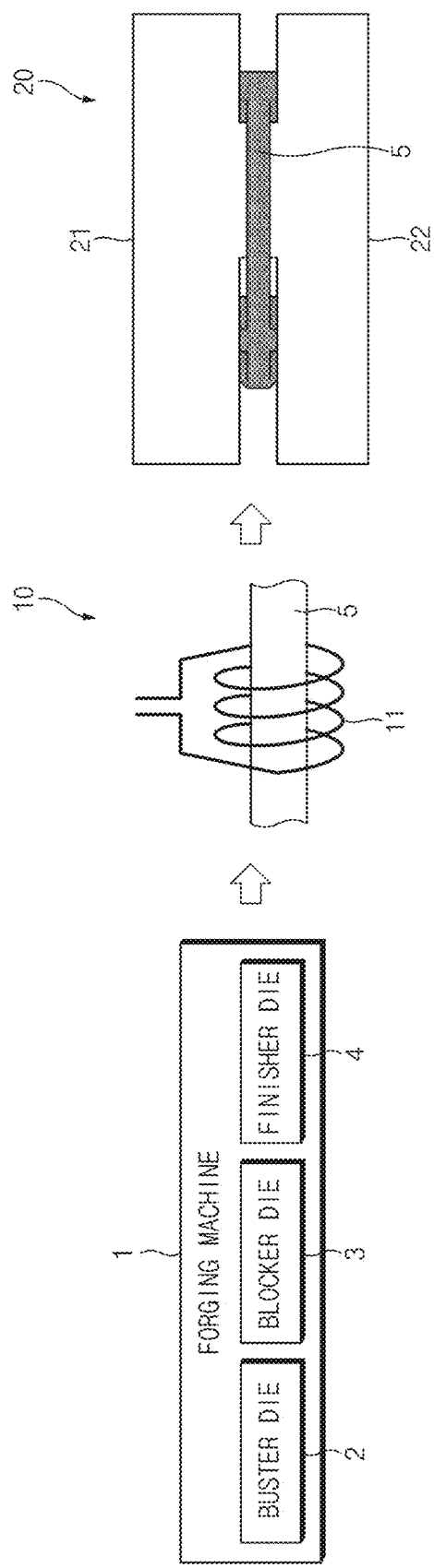
FIG. 2 illustrates an apparatus for manufacturing a forged component according to an embodiment of the present disclosure.

Referring to FIGS. 1 and 2, a method for manufacturing a forged component according to an embodiment of the present disclosure may include performing hot forging on a material (S2) in order to manufacture a forged component. As is well known, hot forging is performed at a temperature higher than a recrystallization temperature of metal.

The hot forged material may be heated to a first set temperature (S5), and warm coining may be performed to correctly shape the heated material (S6). The first set temperature may be referred to as a temperature for warm coining.

Meanwhile, the material may be heated to a second set temperature (for example, a temperature range of 1100° C. to 1200° C.) (S1) before hot forging (S2). Thereafter, the material heated to the second set temperature may be hot forged (S2). Here, the second set temperature may be referred to as a temperature for hot forging, and the second set temperature may be higher than the first set temperature.

Hot forging is a manufacturing process in which the material is made into a desired shape by putting the material into a hot forging machine 1 and applying pressure to the hot forging machine 1. The final shape may usually be formed by two or three pressing operations. The hot forging machine 1 may include an upper die and a lower die having cavities conforming to the shape of a hot forged component.

For example, the hot forging machine 1 may include a buster die 2, a blocker die 3, and a finisher die 4. Thus, buster, blocker, and finisher operations (S2) may be carried out on the material using the buster die 2, the blocker die 3, and the finisher die 4, respectively. When the volume of a final product is 100%, the material may have a volume of 120% to 130% in the buster operation, 110% to 120% in the blocker operation, and 100% in the finisher operation. The buster operation may be performed using the buster die 2 to greatly compress the material to remove scale and maintain a proper forging ratio. The blocker operation may be performed using the blocker die 3 to work the bustered material into a shape that more closely resembles the final shape. The finisher operation may be performed using the finisher die 4 to create the final shape. The volume for each operation may be determined through simulations including forming analysis in a die design.

Thereafter, the hot forged material may be trimmed and pierced (S3). Trimming is to remove flash or excess metal, and piercing is performed using a punch and/or the like.

The trimmed and pierced material may then be subjected to controlled cooling to a third set temperature at a predetermined cooling rate (S4). The third set temperature may be referred to as a cooling temperature, and the third set temperature may be lower than or equal to the first set temperature. For example, the trimmed and pierced material may be cooled to the third set temperature (for example, 600° C.) at a cooling rate of 1-4° C./s.

Thereafter, the controlled cooled material 5 may be heated to the first set temperature in a short period of time (S5).

According to an embodiment, the controlled cooled material 5 may be heated to the first set temperature (for example, a temperature range of 600° C.-700° C.) by performing high-frequency induction heating for 5 to 10 minutes. The controlled cooled material 5 may be heated to the first set temperature through high-frequency induction heating by a high-frequency induction heater 10.

According to an embodiment, the first set temperature may be 600° C.-700° C., the second set temperature may be 1100° C.-1200° C., and the third set temperature may be 600° C. The second set temperature (forging temperature) may be higher than the first set temperature (warm coining temperature), and the third set temperature (cooling temperature) may be lower than or equal to the first set temperature.

Referring to FIG. 2, the high-frequency induction heater 10 may include a heating coil 11. As a high-frequency alternating current (AC) is applied to the heating coil 11, and the material 5 is located within the heating coil 11, the material 5 may be heated to the first set temperature (temperature for warm coining) by the heating coil 11.

Warm coining may then be performed to correctly shape the heated material 5 (S6). The heated material 5 may be put into a warm coining machine 20. The warm coining machine 20 may be a forging press machine including an upper coining die 21 and a lower coining die 22, and the lower coining die 22 may be located below the upper coining die 21. The upper coining die 21 and the lower coining die 22 may have a cavity conforming to the shape of the forged component. Referring to FIG. 2, the forged component may be a connecting rod, and the upper coining die 21 and the lower coining die 22 may have a cavity conforming to the shape of the connecting rod. The thickness, bending, and the like of the heated material 5 may be corrected through warm coining by the warm coining machine 20.

Referring to FIG. 2, the warm coining machine 20 may be located close to the downstream side of the high-frequency induction heater 10. This allows the material 5 heated by the high-frequency induction heater 10 to be immediately subjected to warm coining, thereby significantly improving coining quality, mechanical properties, and the like. In particular, the warm coining machine 20 may be continuously located on the downstream side of the high-frequency induction heater 10 so that the material 5, which is heated to the warm coining temperature by the high-frequency induction heater 10, may be immediately subjected to warm coining.

According to an embodiment, shot blasting may be performed on the surface of the warm coined material (S7). By removing the oxide scale produced by oxidation from the coined material through shot blasting, the forged component may be completed.

According to an embodiment, the forged component may be a connecting rod used in an engine of a vehicle.

According to an embodiment, the material of the forged component may be non-quenched and tempered steel. The non-quenched and tempered steel may be a material that can achieve the same mechanical properties, even without thermal treatment (quenching and tempering) performed on conventional mechanical structural carbon steels.

According to another embodiment, the material of the forged component may be non-quenched and tempered steel containing vanadium (V). By adding vanadium (V), strength may be improved by precipitation of vanadium carbide (VC). For example, the material of the forged component may be mainly composed of iron (Fe), and include carbon (C), silicon (Si), manganese (Mn), phosphorus (P), sulfur (S), chromium (Cr), molybdenum (Mo), nickel (Ni), aluminum (Al), vanadium (V), and nitrogen (N).

According to the above-described embodiment of the present disclosure, heating (high-frequency induction heating) and warm coining may be performed on the hot forged material. This allows the omission of heat treatment such as stress relief annealing (SRA) and cold coining according to the related art. This may reduce a bending amount associated with spring back and may prevent the occurrence of bursts during cold coining, thereby improving mechanical properties, coining quality, and process quality.

Table 1 below illustrates results obtained by comparing the mechanical properties, coining quality, and process quality of a forged component (disclosed example) manufactured by high-frequency induction heating and warm coining according to an embodiment of the present disclosure with those of forged components (comparative examples 1 and 2) according to the related art. Comparative example 1 may be a forged component manufactured by cold coining and SRA heat treatment, and comparative example 2 may be a forged component manufactured by cold coining.

TABLE 1

|  | Mechanical Properties | | | Coining Quality | | Process Quality |
| --- | --- | --- | --- | --- | --- | --- |
|  | Yield Strength (MPa) | Tensile Strength (MPa) | Elongation (%) | Bending Amount (mm) | Residual Stress (MPa) | Burst during Coining | Re-fastening Cylindricity (μm) |
| Disclosed Example | 861 | 1,146 | 14.0 | 0.17 | 5.8 | None | 6.9 |
| Comparative Example 1 | 877 | 1,124 | 12.8 | 0.55 | −88 | Burst Occurred | 11.3 |
| Comparative Example 2 | 872 | 1,151 | 13.9 | 0.52 | 198.8 | Burst Occurred | 12.9 |

A big end of the connecting rod may have a crank pin bore to which a crank pin is connected. As two bolts are fastened to the big end of the connecting rod, the final shape and dimension of the crank pin bore may be determined. The cylindricity of the crank pin bore when two bolts are re-fastened may be referred to as re-fastening cylindricity. As can be seen in table 1, compared to comparative examples 1 and 2, the disclosed example shows improvements in mechanical properties such as yield strength, tensile strength, and elongation, and in coining quality. This is because there is no occurrence of burst (for example, bursting at the large end of the connecting rod) during coining. In addition, it is evident that the spring back in the disclosed example is reduced by warm coining, so the bending amount is reduced by 60% compared to comparative example 1. It is evident that residual stress in the disclosed example is reduced by 97% compared to comparative example 2. Also, the re-fastening cylindricity of the connecting rod in the disclosed example is reduced by approximately 50% compared to comparative example 2. In particular, the residual stress and the re-fastening cylindricity in the disclosed example are reduced to be close to those in comparative example 1, which proves that the SRA heat treatment may be omitted. For reference, as the residual stress increases, a failure rate in fracture splitting may increase. If the forged component is a connecting rod, as the re-fastening cylindricity of the connecting rod increases, engine durability may decrease.

According to the above-described embodiments of the present disclosure, post-treatment operations such as SRA heat treatment and shot blasting may be eliminated more than once, resulting in significantly reduced cost. Despite the elimination of some operations, the mechanical properties (durability) and process quality (re-fastening cylindricity) equivalent to those according to the related art may be reliably achieved.

By using the above-described method and apparatus, the connecting rod having a bending amount of 0 to 0.4 mm and a residual stress of −50 to 50 MPa may be manufactured.

As set forth above, according to embodiments of the present disclosure, heating (high-frequency induction heating) and warm coining may be applied to the hot forged material. This may reduce the bending amount associated with the spring back, and prevent the occurrence of bursts during cold coining, thereby improving mechanical properties (durability), coining quality, and process quality.

Hereinabove, although the present disclosure has been described with reference to embodiments and the accompanying drawings, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A method for manufacturing a forged component, the method comprising:
   heating a material to a second set temperature;
   performing hot forging on the material after heating the material;
   cooling the hot forged material to a third set temperature at a predetermined cooling rate after performing hot forging on the material;
   reheating the hot forged material to a first set temperature after cooling the hot forged material; and
   performing warm coining to correctly shape the reheated material after reheating the cooled material,
   wherein the third set temperature is lower than or equal to the first set temperature.

2. The method according to claim 1, wherein the second set temperature is higher than the first set temperature.

3. The method according to claim 2, wherein the second set temperature ranges from 1100° C. to 1200° C.

4. The method according to claim 1, wherein the predetermined cooling rate is 1-4° C./second.

5. The method according to claim 1, wherein the hot forged material is trimmed and pierced, and
   wherein the trimmed and pierced material is controlled cooled to the third set temperature at the predetermined cooling rate.

6. The method according to claim 1, wherein shot blasting is performed on a surface of the warm coined material.

7. The method according to claim 1, wherein the forged component is a connecting rod used in an engine of a vehicle.

* * * * *